B. A. ALPERIN.
CASE FOR TIRE PARTS.
APPLICATION FILED NOV. 12, 1909.
966,415.
Patented Aug. 9, 1910.
2 SHEETS—SHEET 2.
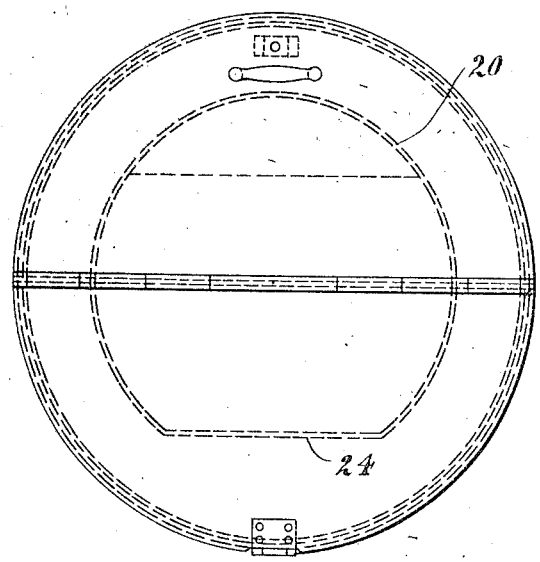
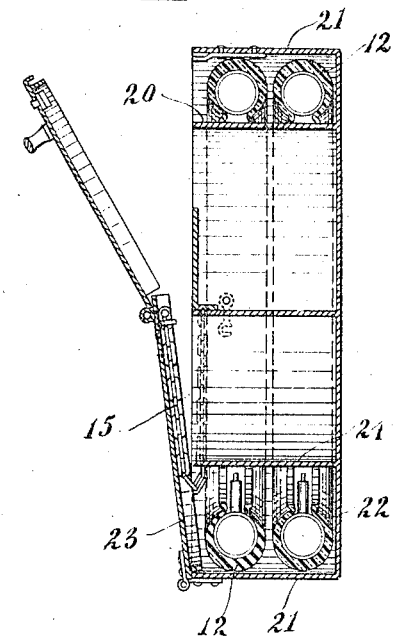
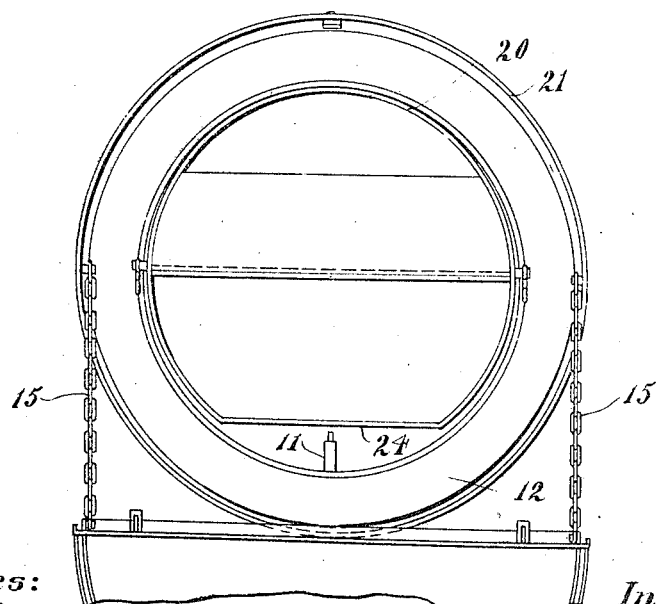
Witnesses:
L. C. Badeau
H. D. Penny
Inventor:
Bernard A. Alperin,
By his Attorney, F. H. Richards.

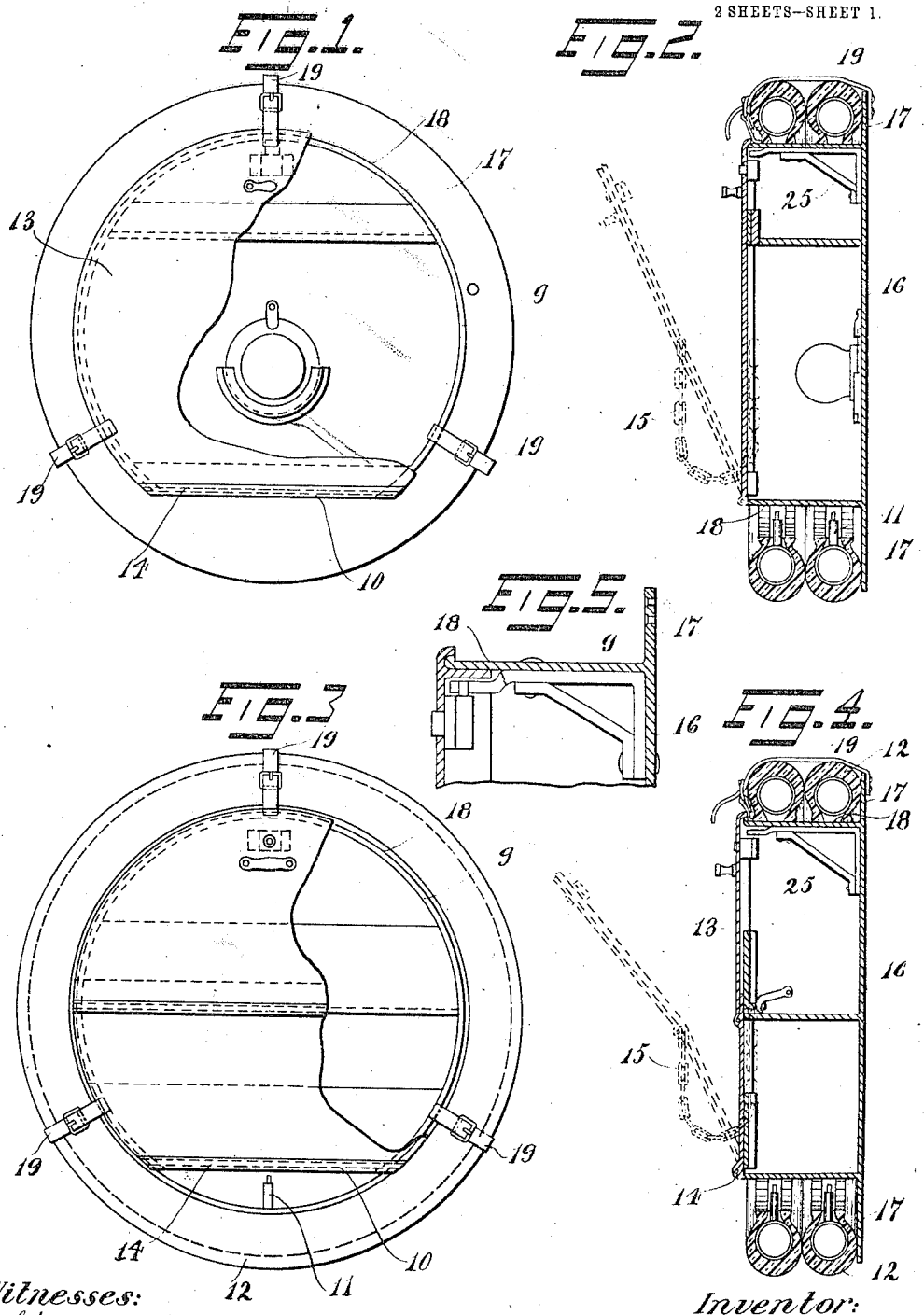

UNITED STATES PATENT OFFICE.

BERNARD A. ALPERIN, OF NEW YORK, N. Y., ASSIGNOR TO LAFAYETTE B. GLEASON, OF DELHI, NEW YORK.

CASE FOR TIRE PARTS.

966,415.  Specification of Letters Patent.  Patented Aug. 9, 1910.

Application filed November 12, 1909. Serial No. 527,604.

*To all whom it may concern:*

Be it known that I, BERNARD A. ALPERIN, a citizen of the United States, residing in New York, in the county of New York and State of New York, have invented certain new and useful Improvements in Cases for Tire Parts, of which the following is a specification.

The object of this invention is to provide an improved form of tire case or carrier in which a drum shaped member adapted to have an automobile tire placed on its periphery and supported thereon, has a portion of its periphery flattened to extend in a plane, to accommodate the inwardly extending valve of the tire.

A further object of the invention is to provide improved construction of the drum shaped member whereby its periphery will be strengthened to support the tire member or members.

In the accompanying drawing illustrating embodiments of my invention, Figure 1 is a plan view with the lid partly broken to show the interior. Fig. 2 is a vertical section showing the tires in position. Fig. 3 is a front elevation, partly broken of a slight modification. Fig. 4 is a vertical section of the device shown in Fig. 3. Fig. 5 is an enlarged section showing the brace at the upper part. Fig. 6 is a front view of another modification. Fig. 7 is a vertical section through the latter; and Fig. 8 shows the same device with the lid open.

As shown in Figs. 1–4 a drum shaped member 9 is provided, with a diameter slightly less than the inner diameter of the tires that are placed and supported thereon, as indicated in Figs. 2, 3 and 4. Frequently both the shoe and inner case are assembled; that would cause the valve to interfere with the periphery of the case and prevent the tire being slid thereon. Also, frequently ready-flated tires, or the tire and rim are placed on these cases, that are made slightly smaller to permit the rim to be used. The purpose of the present invention is to provide a flattened peripheral portion made as it were, by removing a segment of the drum. As shown the casing 9 has a flat wall 10 at one portion that is of sufficient distance removed from the circle of the periphery of the other portion of the drum, to allow for the length of the valve 11 projecting from the tire 12. It is preferable that the drum be assembled on the car with this flattened peripheral portion at the bottom. The case 9 may have its front 13 hinged at the bottom at 14 for access for the insertion and removal of various articles desired to be carried in the case, such as inner tubes, valves, tire repair articles or any other articles desired. The lid 13 may be connected with the case by a chain 15 on each side to prevent its falling all the way down.

Various means may be provided for holding the tires on the casing and several means are shown. In the construction of Figs. 1–5 the back member 16 has its periphery 17 extended beyond the peripheral wall 18 of the drum shaped member. Suitable straps 19 are attached to this wall 16 and to the peripheral wall 18 for securing the tires in position.

In Figs. 6, 7 and 8 the tires are held on the inner drum member 20 by providing an outer peripheral member 21 secured to the extended back member 22. This outer member is connected with the hinge lid 23; which construction entirely incloses the tires. This drum member 20 has the flattened peripheral portion 24 similar to the flattened wall 10 of the other construction described.

Since the weight of the tires is sustained by the peripheral member 18, it is desirable to provide bracing means to prevent the member being bent downward. A bracket 25 is secured inside of the drum member, between the periphery and the rear wall 16, that will prevent depression of the peripheral wall.

Having thus described my invention, I claim:—

1. A case for tire parts comprising a drum-shaped member having the peripheral wall at one portion extending in a plane forming a chord of the circumference, to permit the supporting of a tire having a valve stem extending inwardly, and means connected with the case to retain the tires in position on the periphery.

2. A case for tire parts comprising a drum-shaped member having the peripheral wall at one portion extending in a plane forming a chord of the circumference, to permit the supporting of a tire having a valve stem extending inwardly, and means connected with the case to retain the tires in position on the periphery, one of the flat walls of the drum being extended a considerable distance beyond the said peripheral wall to engage the surrounding tire, and provided with means to support the same.

3. A case for tire parts comprising a drum-shaped member having the peripheral wall at one portion extending in a plane forming a chord of the circumference, to permit the supporting of a tire having a valve stem extending inwardly, means connected with the case to retain the tires in position on the periphery, one of the flat walls of the drum being extended a considerable distance beyond the said peripheral wall to engage the surrounding tire, and provided with means to support the same, and a diagonally extending brace between the peripheral member and the rear member of the case.

4. A tire supporting case comprising a drum-shaped member having one of the flat walls extended a considerable distance beyond the periphery to engage the surrounding tire and form a support for the same, supporting means connected with said extended flange for supporting the tires, and a diagonally extending brace located inside of the member and extending between one of the walls and the said peripheral member.

BERNARD A. ALPERIN.

Witnesses:
CHARLES F. REGAN,
HERMAN TOLK.